Aug. 12, 1924.
E. TROVA
1,504,848
THERMOSTATIC CONTROL MEANS
Filed July 17, 1922   2 Sheets-Sheet 1
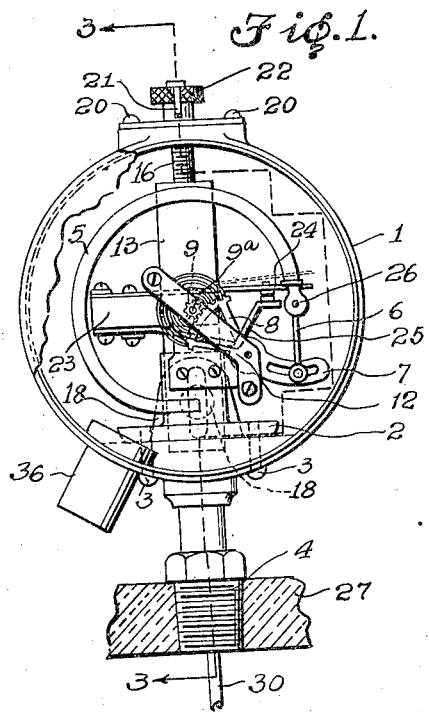
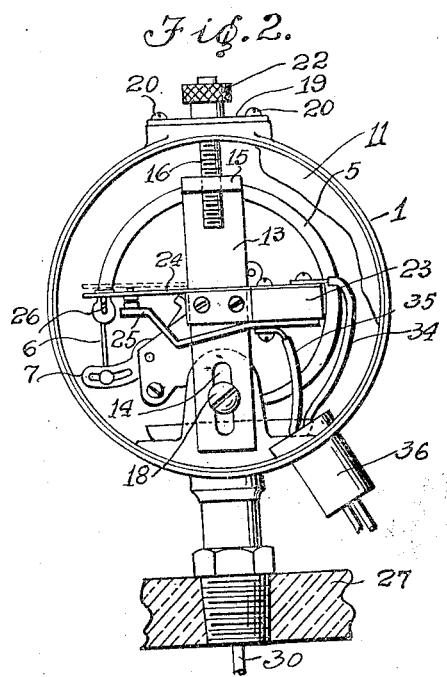
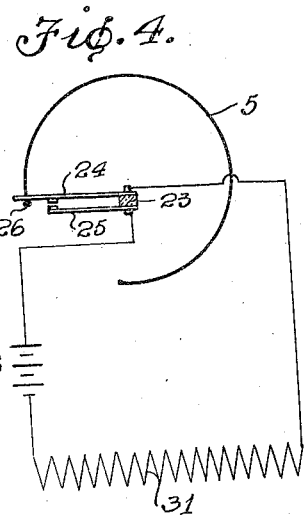
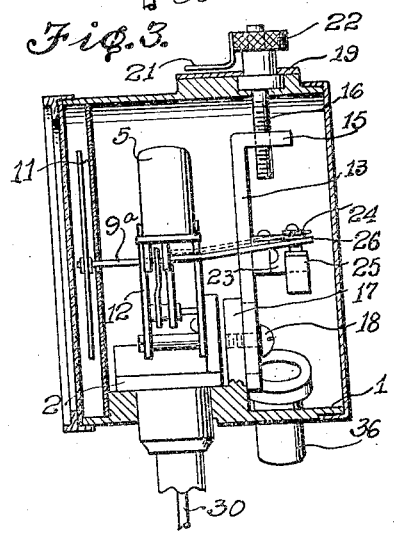
Inventor:
Ernest Trova.
By Fred'k J. Harmon
Attorney.

Aug. 12, 1924.
E. TROVA
1,504,848
THERMOSTATIC CONTROL MEANS
Filed July 17, 1922   2 Sheets-Sheet 2
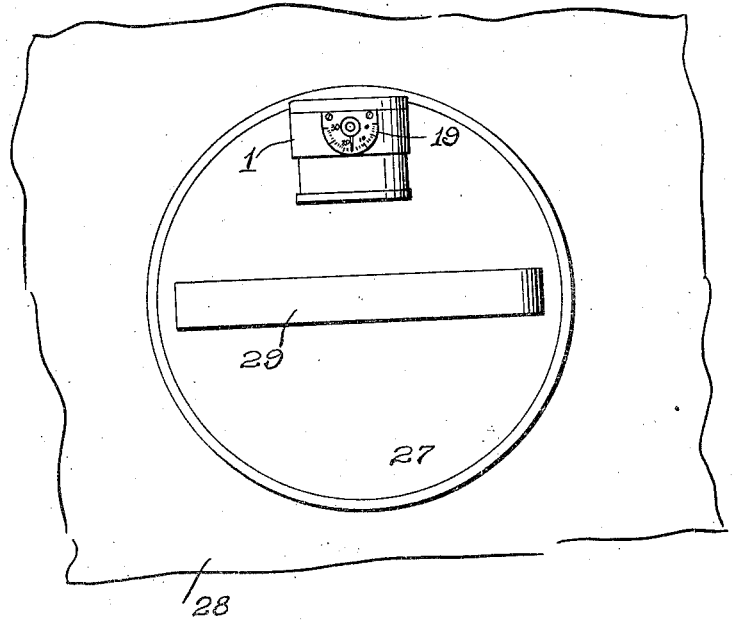
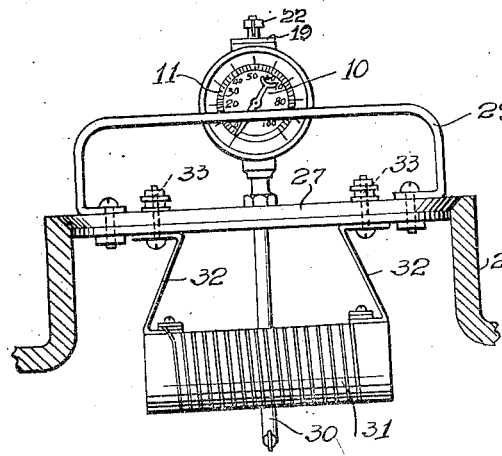
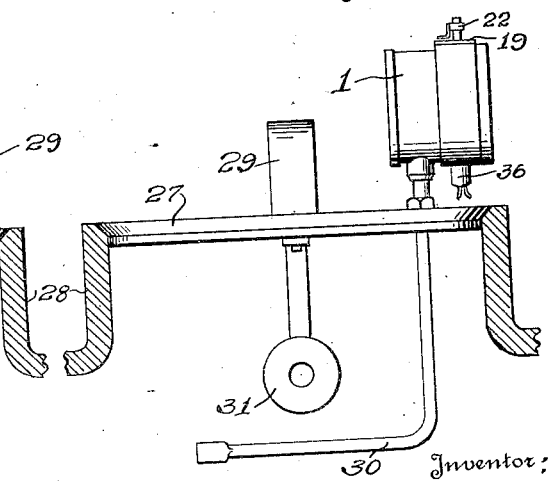
Inventor:
Ernest Trova
By Fred'k J. Karson
Attorney Patented Aug. 12, 1924.

1,504,848

UNITED STATES PATENT OFFICE.

ERNEST TROVA, OF ST. LOUIS, MISSOURI.

THERMOSTATIC CONTROL MEANS.

Application filed July 17, 1922. Serial No. 575,454.

*To all whom it may concern:*

Be it known that I, ERNEST TROVA, a citizen of the United States, residing in the city of St. Louis and State of Missouri, have invented certain new and useful Improvements in Thermostatic Control Means, of which the following is a specification.

My invention relates to a thermostatic control means for regulating the temperature of electric ovens, incubators and like apparatus.

One of the principal objects of the invention is to provide an adjustable mechanism for the purpose of maintaining the temperature in the heating chamber of the apparatus at a predetermined constant degree.

A further object is the provision of a temperature control means in combination with the heating element of the oven or heating chamber.

A still further object is the provision of such temperature control means in combination with a temperature indicator.

These and other objects will be apparent from an examination of the following description and the accompanying drawings, in which:

Fig. 1 is a front elevation of the control device, with the dial and indicating hand of the indicator removed.

Fig. 2 is a rear elevation of the control device with the back cover removed in order to show the parts.

Fig. 3 is a vertical section on the line 3—3 of Fig. 1.

Fig. 4 is a wiring diagram for the electrical connections.

Fig. 5 is a top plan view of the thermostatic control apparatus in combination with the cover plate of the heating chamber.

Fig. 6 is a front elevation of the apparatus and part of the heating chamber in section.

Fig. 7 is side elevation of the apparatus and part of the heating chamber in section.

Referring to the drawings, the reference character 1 designates the casing and the numeral 2 designates the base which is secured to the bottom of the casing by the screws 3. Passing through the base 2 and terminating in the screw threaded coupling 4 is one end of the heat responsive element 5, preferably of the Bourdon tube type, as shown. The other end of the heat responsive element 5 is connected by the link 6 to the slotted arm 7 of the rack 8 which engages the pinion 9 that operates the shaft $9^a$ to which is connected the indicating hand 10 that cooperates with the dial 11, these latter parts being shown more clearly by Figs. 3 and 6. The rack 8 and pinion shaft 9 are pivoted in the frame 12 secured to the base 2. The construction of the parts thus far described is well known and is obvious to those familiar with gauges of this type.

An important feature of my invention resides in the provision of the adjusting plate 13 provided with the slotted portion 14 at its bottom and the flange portion 15 at the top, the flange having a screw threaded opening which cooperates with the screw 16 in a manner to be hereinafter described. Upstanding from the bottom of the casing 1 is the lug 17 which together with the screw 18 that passes through the slot 14 act as a guide for the adjusting plate 13. The screw 16 is rotatably movable but longitudinally immovable in the top of the casing 1 as will be apparent from an inspection of the drawing and is held in position by the retaining plate 19 secured to the top of the casing by the screws 20, as shown, the plate 19 being graduated on its top surface, as shown by Fig. 5, to constitute a dial on which readings are to be indicated by the pointer 21 which is fixed to the thumb nut 21 of the screw 16. It will be obvious that rotation of the screw 16 causes a longitudinal movement of the adjusting plate 13 and that the amount of this longitudinal movement may be measured on the dial on the plate 19, or any other suitable and well known means may be employed to measure the amount the adjusting plate is moved.

Secured to the adjusting plate 13 is an insulating block 23 on which are mounted the spring electrical conductors 24 and 25, provided with suitable contact points as shown and constituting a switch which is normally closed by the spring action of the conductor members. The spring conductor 24 is longer and extends beyond the conductor 25 and the end of the heat responsive element 5 having connected thereto the arm 26. The conductor 24 is thus in the path of movement of the arm 26 and it will be understood that upon expansion of the Bourdon tube 5 beyond a certain extent the arm 26 will move the spring conductor 24 from its contact with the spring conductor 25 and thus open the switch.

The essential elements of the thermostatic control mechanism have thus been described. The casing containing the above described mechanism is mounted on a cover plate 27 of an electric oven, incubator or other heating chamber part of which is conventionally represented by Figs. 5 to 7 and is designated by the reference character 28. The cover plate is provided with a suitable handle 29 and the cover plate may thereby be readily removed or placed in position. Connected to the screw coupling 4 of the Bourdon tube 5 and passing through the cover plate 27 into the heating chamber 28 is the tube 30 closed at its end as shown. This tube 30 and the Bourdon tube 5 are filled with a fluid sensitive to heat and expansible when heated, such as ether, for instance, and it will be understood that as the fluid is heated the pressure acts on the heat responsive element or Bourdon tube 5 which is thereby expanded as is well known. The expansion of the heat responsive element will of course operate the arm 26 and move it to separate the spring conductors 24 and 25 and break their contact with each other.

Secured to the cover plate 27 and depending from the bottom thereof is the electrical heating element or coil 31. The cover plate 27 is made from heat and electric insulating material such as asbestos or fibre. The coil 31 is hung from the cover plate by means of the conducting strips 32 which are electrically connected to the ends of the coil 31 and to the binding posts 33 in the cover plate 27. It will thus be seen that the strips 32 serve a dual function in that they serve as the supporting means for the heating coil 31 and also serve to transmit the heating current as part of the electric circuit of the system. The heating coil 31 is connected in series with a source of current B and the spring conductors 24 and 25, as shown by the wiring diagram represented by Fig. 4. Insulated wires 34 and 35 pass through the bushing 36 and are connected to the conductors 24 and 25, as shown more clearly by Fig. 2, these wires being in series with the heating element and the source of electric energy B.

The operation of the device will be easily understood from the above description. The adjusting plate 13 will be moved by rotating the screw 16 so that the projecting end of the conductor 24 will be in proper spaced relation to the arm 26 or in such relation to the arm 26 at a predetermined temperature in the heating chamber 28. When the temperature in the chamber exceeds a certain degree, the arm 26 will bear on the conductor 24 and move it from contact with its companion conductor 25, thus opening the switch consisting of these conductors and breaking the circuit. When the temperature in the heating chamber becomes reduced below the desired temperature, the arm 26 will permit the conductor 24 to again contact with the conductor 25 and the circuit will again be closed for further heating of the chamber. It will be understood that the dial on the plate 19 will be calibrated with respect to the temperature changes causing definite movement of the outer end of the Bourdon tube 5 and consequent movement of the arm 26 so that for a given rotation of the screw 16, a definite movement of the adjusting plate 13 will be had so that the projecting end of the conductor 24 will be in proper relation to the arm 26 at a predetermined temperature, and when this temperature is exceeded the arm 26 will be in position to move the arm 24 from the conductor 25 and thus break the circuit.

From the foregoing description it will be apparent that there is provided a simple structure which comprises as a unit a heating element, an indicating element, and a heat regulating element conveniently arranged in combination with the cover plate of the heating chamber. While a specific heating and indicating element are shown, it will be understood that such elements are illustrative of the invention and other types of heaters and indicators may be used. The combination with the cover plate is considered an important feature of the invention, although the heat indicating element and heat regulating element are novel in themselves. And while I have shown and described the preferred embodiment of the invention, it will be understood that certain changes may be made within the scope of the claims.

Having thus described my invention, what I claim and desire to secure by Letters Patent of the United States is:

1. A heat regulating device comprising in combination with the heating element of the heating chamber, a removable cover plate for the heating chamber supporting the heating element from the inner side thereof, a casing supported by and above the outer side of the cover plate, a heat responsive element in said casing extending through the cover plate and downwardly at a distance from one side of and laterally below the heating element, a switch for the electric heating circuit in said casing, and a connection in said casing for actuating said switch operated by said heat responsive element.

2. A heat regulator comprising in combination with the heating element of a heating chamber, a removable and replaceable cover plate for the heating chamber supporting the heating element from the inner side thereof, a casing supported by and above the opposite side of the cover from said heating element, a Bourdon tube in said casing, a tube in connection with the Bourdon tube extending through the cover plate and downwardly at a distance from one side of and laterally below the heating element, two resilient contact members within the casing normally in contact with each other, and a connection operated by said Bourdon tube for separating said resilient members whereby the heating circuit is opened.

In testimony whereof, I have hereunto signed my name to the specification.

ERNEST TROVA.